April 15, 1952     J. M. WALTER     2,593,230

MACHINE TOOL SLIDE BEARING

Filed Dec. 13, 1946

INVENTOR.
JOHN M. WALTER.
BY Allen & Allen
ATTORNEYS.

Patented Apr. 15, 1952

2,593,230

UNITED STATES PATENT OFFICE 2,593,230

MACHINE TOOL SLIDE BEARING

John M. Walter, Cincinnati, Ohio, assignor to
The G. A. Gray Company, Cincinnati, Ohio, a
corporation of Ohio Application December 13, 1946, Serial No. 716,139

6 Claims. (Cl. 308—3)

My invention relates to the provision of slide bearings for machine tools in which heavy supporting columns are caused to move slowly for purposes of adjustment over supporting bases, being guided and supported by generally rectangular ways.

In my Letters Patent No. 2,378,343 I have described a discovery made by me that laminated resinous strips would act as a suitable bearing surface for high speed tables on supporting ways, and insulate the moving table from heat generated by this movement of the table over the ways. In my application for Letters Patent Ser. No. 587,860 filed April 12, 1945, now Patent No. 2,479,653, I have described a particular orientation of laminae and particular mounting means for carrying out the objectives of my said patented invention or for any slide bearing in machine tools. I have now discovered that this same material can be used in connection with slowly moving heavy weight columns or saddles, in which the movement is normally for adjusting purposes rather than for a working stroke, and in which the problem is one of maintaining accuracy of bearing surface.

After a number of months of use it is frequently developed that the supporting ways in this last noted type of machine tools are scored and thus roughened. A roughened way will result in inaccurate movement of the tool operating column or saddle, and often the machines must be sent back to the factory for re-machining and readjustment of the slide bearing surfaces.

I have found that laminated bearing plates mounted on the moving part in such machine tool combinations, with provision for expansion and contraction without buckling, will have a very long life and have the additional advantage of being replaceable with new plates. The laminated resinous material is developed to have the strength to supply a non-rippling support in a flat surface for major gravity loads, and at the same time should a piece of grit fall onto the ways on which such a heavy part is moving, the grit will become imbedded in the resinous product, instead of rolling between the supporting surfaces and forming a gouge which as the machine is further used will develop into a major defect requiring repair. Any wear which takes place is confined in large part to the laminated resinous facing, and hence can be cured if the facing becomes scored by removing it and replacing it with another facing and machining this facing to a proper sliding surface.

Another problem in such machine tools is the fact that it is required to guide the moving members very closely by elements which embrace at least one of the ways from the side. This selected way is called the "narrow guide" in such machine tools, and one way to supply a close engagement with the narrow guide where the ways are rectangular in cross section and the moving member has channels fitting over the ways, is to supply tapered gibs to engage one of the side walls of the way, and to machine surfaces on the opposite channel wall which engages the opposite side of the way. These machined surfaces do not extend the whole length of the moving member but generally are restricted to the zone which is occupied by the tapered gib which is opposite thereto. The previous way of accomplishing this using all metal gibs, has been to machine the said surfaces (micrometer accuracy), and scrape the intervening metal of the channel wall away so that the only close slide bearing at the side of the way, is the micrometer machined surface.

It is a further object of my invention to provide for the utilization of the laminated resinous material in connection with the narrow guide lateral engagements of the column or saddle in such machine tools.

In the drawings, I have shown a typical example of my invention and will describe the same, the novelty therein to be set forth in the appended claims.

The base 1, having the ways 2 thereon, in this case three in number, is a conventional structure. I have indicated a column plate or saddle 3 located on the base, the showing being merely the heavy mounting plate on which the column with its tool retaining and adjusting devices, drives, etc. will be arranged. The narrow guide in this instance is the middle way 2. It could be any one of them or more than one of them if desired.

Figure 1:
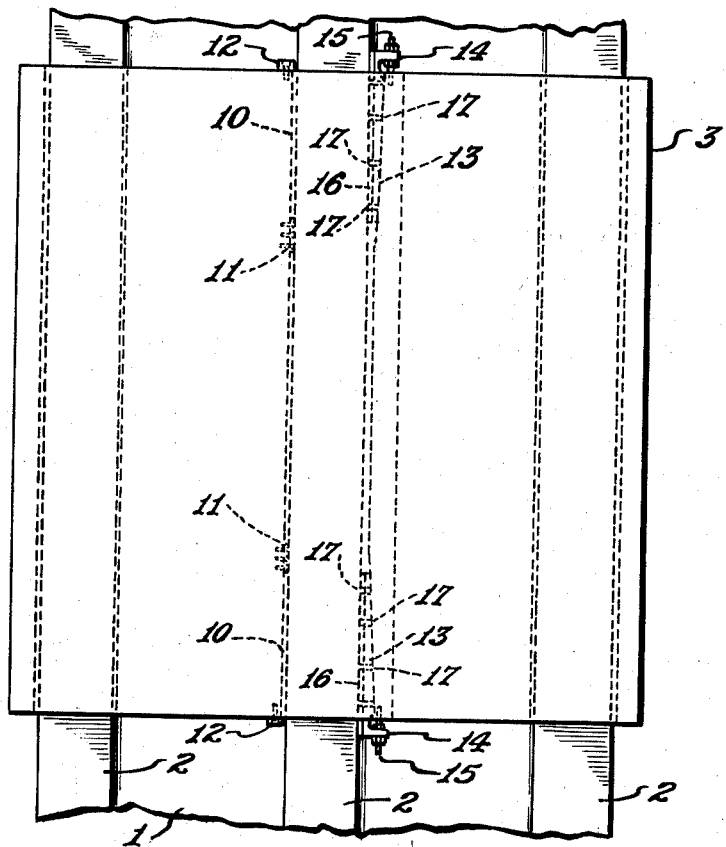
Figure 1 is a plan view of a base and column showing the application of my invention.
Figure 2:
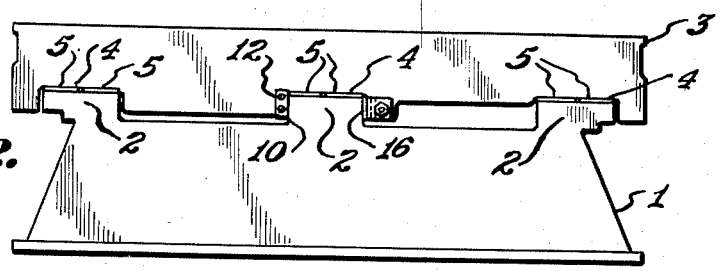
Figure 2 is an end elevation thereof.
Figure 3:
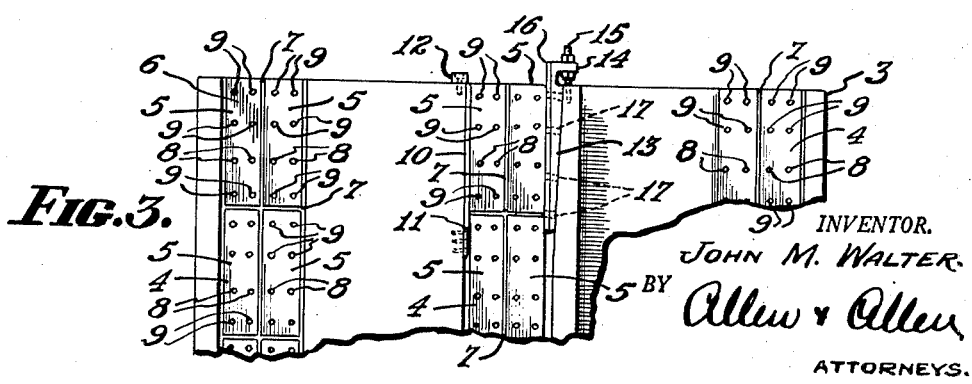
Figure 3 is a fragmentary bottom view of the column supporting plate.

The column plate 3 has channels 4 therein which embrace the ways 2. As shown best in Fig. 3, the bottom of each channel 4 is equipped with plates 5 of laminated resinous material. As in my application for patent noted above, the laminae in these pieces extends transversely of the plates and in the direction of movement. In the case of the plates 5 in the illustrated showing, this means that laminae 6 extend vertically of the plates and lengthwise thereof. The resinous material serving as the binder will be preferably a phenolic type resin and the laminae will be cloth preferably, such as is used in making high grade resin laminates.

The plates are held in place with a slight spacing between them, indicated by the double lines at 7, which space is not particularly visible except as a line of demarcation in the finished product. To hold the pieces in place, the preferred method adopted is that of my application for patent, using pins also made of laminated resinous product, cut from rods thereof. The intermediate pins 8 will be a tight fit in the saddle 3 and in the plates 5, and the pins 9 will have a somewhat loose fit in the plates 5, but a tight fit in the saddle. This is my preferred construction. After mounting the plates so as to cover substantially the bearing surface of the bottoms of the channels where they rest on the ways, it is desirable then to machine the surface so formed to close accuracy.

As noted above, this arrangement not only serves as a good bearing surface for a short time, but is very long lasting and does not develop any ripples, as might be expected from the slow movement of the very heavy parts in adjusting the column to and fro. As already noted if a small chip of metal or other grit gets caught between the ways and the channels, there is a tendency for it to become imbedded in the phenolic condensation laminae, without tearing them, due to the laminar direction, and without rolling along and accumulating, thus making a lengthy facing or bearing surface.

It could not be predicted from the utility of the resinous laminate to cut down heat transfer in the rapidly moving tables of planers and the like, that the same product would serve the purpose of a permanent and perfect supporting surface in this different set of circumstances, where a flat supporting element and a flat base channel is used, micrometer accuracy is required, and the supported part is extremely heavy and moves very slowly.

It will always be possible to replace a worn plate or plates should the same become damaged or worn, and this can be done without the return of the heavy machine tool or the column, by itself, to the manufacturer.

Referring now to the arrangements on the narrow guide. Instead of machining the one side of the channel which engages the selected narrow guide, to form interspaced surfaces with a scraped recessed portion between them, I provide, in this case, a pair of plates 10 of the same resin laminate, and mount one plate at each end of the one wall of the channel 4 over the narrow guide. To do this no particular structure is required, but I prefer to arrange the mounting so that these plates can be removed without removing the carriage or column base from the bed of the machine, and new plates inserted.

Thus the plates 10, one at each end, opposite to the gibs (to be described), are set in place to abut at the inner end on plates 11 screwed to the side wall of the channel and thinner than the plates 10, so as not to touch the side of the narrow guide. Plates 12 mounted at the ends of the channels engage the other end of the inserted plate, in each case. There is no tendency for the plates to fall down during the use of the machine because the channel does not move to a position of overhang from the narrow guide unless deliberately disconnected from the drive (not shown). Thus endwise movement is all that is required to be avoided.

At the opposite side wall of the channel over the narrow guide I provide for the usual tapered gib 13, engaging a tapered wall of the channel, and held in place by means of an ear 14 thereon which engages over a stud 15 in the end of the column base, with a pair of nuts on the stud to move the gib and hold it in adjusted position. The face of each gib is formed of a resin laminate plate 16, held in place on the surface of the gib by means of pins 17, which may be resin laminate pins. Since the gib facing plates are relatively short and in a single piece, provision for expansion and contraction is not imperative. It is desirable however, to use tight pins at the middle and pins having somewhat free engagement in the laminate plate at the ends, even in this gib facing.

Should the operation of the lateral guiding means on the narrow guide become worn, the wear will be on the laminate plates. Usually all that is required is to loosen the gib, move the column base to a position by disconnecting the drive so that the end of the insert plate 10, at either end of the structure will be available, and demount the holding plate 12. The insert can then be slid out, and a new one inserted and the gib readjusted. Usually this will be done at both ends. The result is to eliminate the necessity of removing the column and its mounting plate, and machining it anew to new dimensions. There is no contact bearing between the channel in the mounting plate for the column and the supporting base except through the inserts of resin laminate.

It should be noted that certain aspects of my invention do not depend on the specific non-metallic material used. For example, rigidly bound fiber plates made by H. W. Johns-Manville Co. called "Ell Slip," may be used in some instances or other rigidly bound fiber plate.

Having thus described my invention, what I claim as new and desire to secure by Letters Patent is:

1. In a machine tool having a base with a series of parallel ways thereon, said ways having rectangular cross section and presenting a flat top, a heavy mounting member on said ways having channel-like portions the bottoms of which lie in flat contact with the ways, means for gibbing the said mounting member on the one of the ways selected for the narrow guide, said means comprising a tapered gib faced where it contacts the side of the narrow guide with a plate of resin laminate, and secured adjustably on one of the channel side walls, and an insert, comprising a plate of resin laminate, secured on the opposite channel side wall corresponding to the gib position.

2. The combination set forth in claim 1 in which the securing means for the last noted plate of resin laminate engage the last noted plate endwise, the mounting being such that upon removal of the securing means located at the end of the channel, the plate may be slid out of position on the channel wall.

3. The combination of claim 1 in which there is a gib at each end of the channel for the narrow guide and a resin laminate plate located at each end in opposition to the said gibs.

4. In a machine tool having a base with a series of parallel ways thereon, said ways having rectangular cross section and presenting a flat top, a heavy mounting member on said ways having channel-like portions the bottoms of which lie in flat contact with the ways, means for gibbing the said mounting member on the one of the ways selected for the narrow guide, said means comprising a tapered gib faced where it contacts the side of the narrow guide with a plate of rigidly bound fiber, and secured adjustably on one of the channel side walls, and an insert, comprising a plate of rigidly bound fiber, secured on the opposite channel side wall corresponding to the gib position.

5. The combination set forth in claim 4 in which the securing means for the last noted plate of rigidly bound fiber engage the last noted plate endwise, the mounting being such that upon removal of the securing means located at the end of the channel, the plate may be slid out of position on the channel wall.

6. The combination of claim 4 in which there is a gib at each end of the channel for the narrow guide and a rigidly bound fiber plate located at each end in opposition to the said gibs.

JOHN M. WALTER.

REFERENCES CITED

The following references are of record in the file of this patent:

UNITED STATES PATENTS

| Number | Name | Date |
| --- | --- | --- |
| 821,690 | Widmer | May 29, 1906 |
| 1,972,827 | Menninger | Sept. 4, 1934 |
| 2,097,340 | Plimmer | Oct. 26, 1937 |
| 2,165,662 | Swan | July 11, 1937 |
| 2,167,609 | Dolle | July 25, 1939 |
| 2,310,053 | Bastian | Feb. 2, 1943 |
| 2,378,343 | Walter | June 12, 1945 |
| 2,479,653 | Walter | Aug. 23, 1949 |